(No Model.) 2 Sheets—Sheet 1.
C. E. & J. W. BATCOCK.
SAW SETTING APPARATUS.
No. 566,290. Patented Aug. 25, 1896.
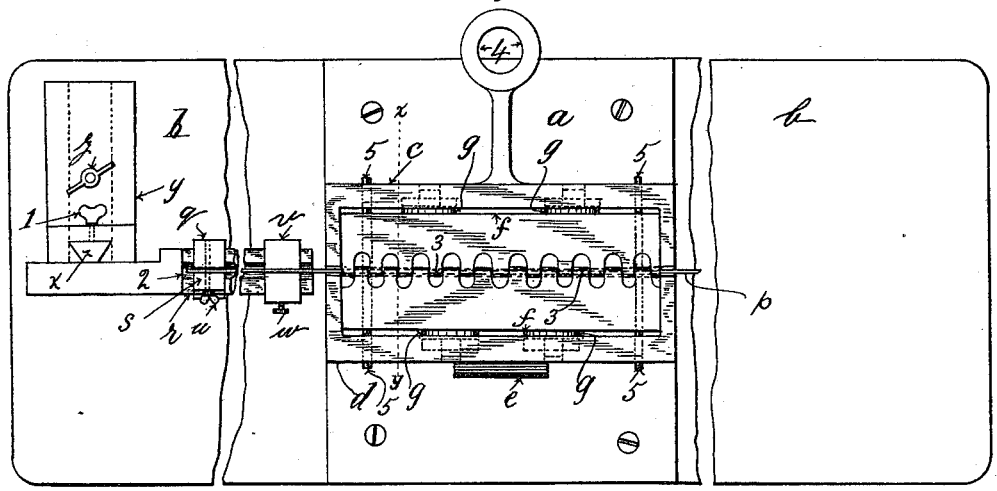
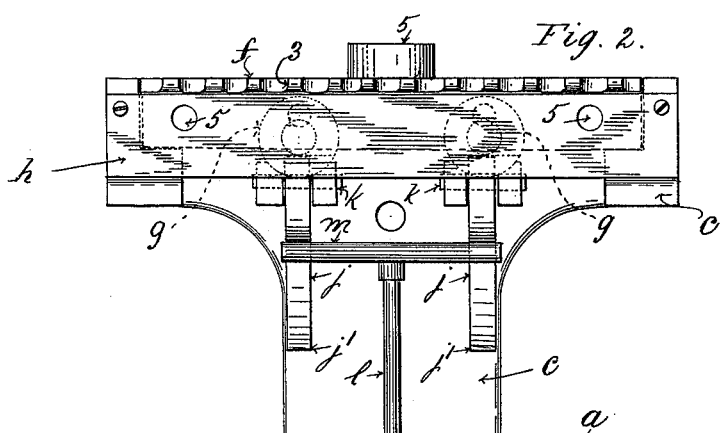
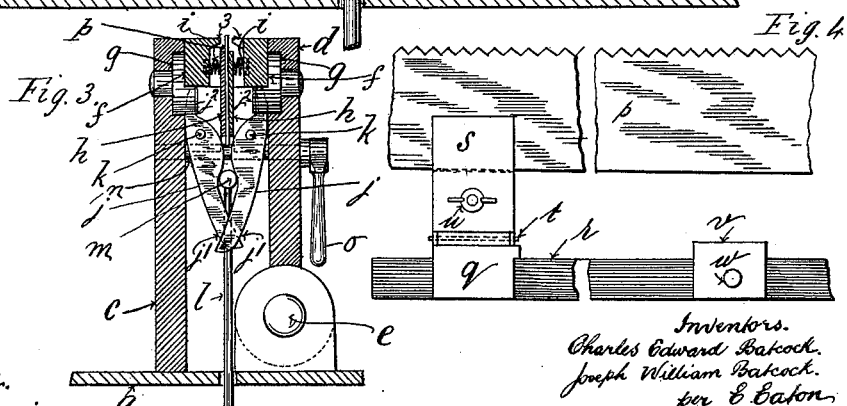
Witnesses.
Benjamin Clark.
James Fleming.
Inventors.
Charles Edward Batcock.
Joseph William Batcock.
per E. Eaton
Their Attorney.
THE NORRIS PETERS CO., PHOTO-LITHO., WASHINGTON, D. C.

(No Model.) 2 Sheets—Sheet 2.
C. E. & J. W. BATCOCK.
SAW SETTING APPARATUS.

No. 566,290. Patented Aug. 25, 1896.

Witnesses.
Benjamin Clark
Horace Grellier.

Inventors.
Charles Edward Batcock
and
John William Batcock
per C Eaton
Their Attorney.

THE NORRIS PETERS CO., PHOTO-LITHO., WASHINGTON, D. C.

UNITED STATES PATENT OFFICE.

CHARLES EDWARD BATCOCK AND JOSEPH WILLIAM BATCOCK, OF LONDON, ENGLAND.

SAW-SETTING APPARATUS.

SPECIFICATION forming part of Letters Patent No. 566,290, dated August 25, 1896.

Application filed August 27, 1894. Serial No. 521,421. (No model.) Patented in England April 27, 1894, No. 8,335.

*To all whom it may concern:*

Be it known that we, CHARLES EDWARD BATCOCK and JOSEPH WILLIAM BATCOCK, subjects of the Queen of Great Britain, and residents of Ponders End, London, in the county of Middlesex, England, have invented certain new and useful Improvements in Saw-Setting Apparatus, (for which we have obtained a patent in Great Britain, No. 8,335, dated April 27, 1894,) of which the following is a full, clear, and exact specification.

This invention relates to an appliance for setting the teeth of saws, and the same is carried out in the following manner, reference being made to the annexed drawings, in which—

Figure 5:
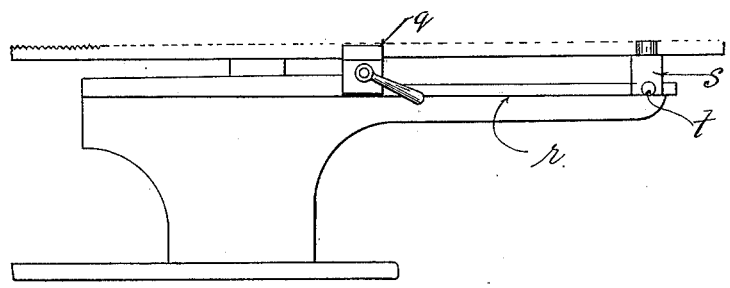
Figure 6:
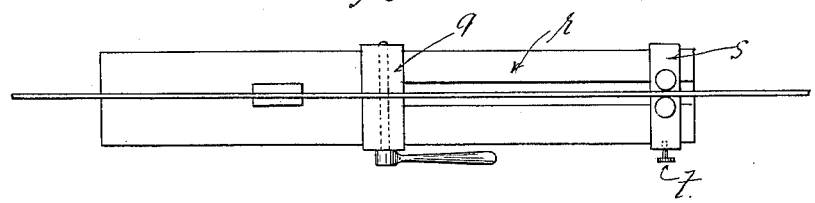

Figure 1 is a plan view showing our invention; Fig. 2, an elevation, to enlarged scale, of one of the setting-jaws; Fig. 3, a section through line $x y$ in Fig. 1; Fig. 4, an elevation, to enlarged scale, of the feeding motion for the saw. Fig. 5 is a side elevation of feed mechanism; Fig. 6, a plan view of same.

$a$ is a base-plate which is mounted upon a table or support $b$. This base-plate $a$ carries two jaws $c$ and $d$, the jaw $c$ being fixed and the jaw $d$ pivoted or hinged at $e$.

$f f$ are two serrated plates which are attached to the bosses $g$, said bosses sliding in apertures or guides in the jaws $c$ and $d$.

$h h$ are plates which form the faces of the jaws.

$i i$ are spiral springs which bear upon the plates $f f$ and maintain them in what may be termed their "normal" position.

$j j$ are two levers of the shape shown, which are pivoted to the jaws $c$ and $d$ at $k$.

$l$ is a rod which carries the bar $m$, and it will be seen that the descent of this bar $m$ will cause the ends $j'$ of the levers $j$ to separate and thus bring the serrated plates together, owing to their being connected to the ends $j^2$ of said levers $j$, Fig. 3.

$n$ is a spindle which is screwed and is operated by the handle $o$ for the purpose of operating the movable jaw $d$ so as to clamp the saw $p$ between the faces $h h$ of the jaws $c$ and $d$.

In Figs. 1 and 4 $q$ is a small clamp which slides upon the V plate or guide $r$ and which has a movable jaw $s$, pivoted at $t$, which clips the saw-blade $p$ through the medium of the set-screw $u$.

$v$ is a stop-piece which slides upon the plate or guide $r$, and may be secured at a desired part thereof by means of the set-screw $w$. The plate or guide $r$ has a dovetail $x$, which slides in a groove in the right-angle-shaped piece $y$. This piece $y$ has a groove which slides in a dovetail secured to the table or support $b$.

$z$ and 1 are set-screws which secure the sliding parts in question so that they may be adjusted as required. The stop-piece $v$ regulates the "play" of the clamp $q$ between the stop-piece $v$ and ridge 2 on the plate or guide $r$.

The operation is as follows: The saw-blade $p$ is clamped between the jaws $c$ and $d$. The bar $m$ is now caused to descend by means of a foot-pedal or other suitable motive power, and the teeth or serrations 3 will engage on the teeth of the saw-blade $p$ and "set" them alternately to each side of the blade. When one batch of teeth has been set, the vise $q$ is released and slid along the guide $r$ to the stop-piece $s$, when the vise is again caused to grip the saw. It is then slid back to the other end of guide $r$, carrying the saw with it. Thus a fresh batch of teeth is placed between the jaws $a$ and $a'$. The saw-blade $p$ is now moved through a distance regulated by the moving clip $q$, that is, the distance between the ridge or shoulder 2 and the stop-piece $v$. When it is desired to set a circular saw, the serrated edges are formed semicircular and the saw is mounted on a bearing which is carried upon an upright rod, this rod being inserted in the aperture 4 in the boss 5, attached to the fixed jaw $c$. The saw is then turned around as the teeth are set.

It will be seen that the details of the invention may be varied without departing from the principle of our invention.

5 5 5 5 are guide-pins inserted in the jaws $c$ and $d$ and which hold the plates $h h$ in place. By employing the guide-pins as set-screws the amount of set given to the saw may be varied, owing to the guide-pin altering the relative position of the serrations or teeth 3 and the plate $h$ and so alters the amount of the set given to the teeth of the saw. The amount of set given to the teeth may also be varied by regulating the amount of movement of the bar $m$ when operating the appliance.

Having thus described our invention, what we desire to claim and secure by Letters Patent is—

In apparatus for setting the teeth of saws in combination, two jaws, one fixed and the other movable, said jaws carrying flat, movable serrated plates, attached to sockets; pivoted levers operating said plates, a bar bearing upon the curved ends of said levers, and operating same, springs for controlling the serrated plates; a movable vise or grip which travels along a guide, and a stop-piece for regulating the length of the feed, and carried upon the guide, substantially as described and illustrated herein.

In testimony that we claim the foregoing we have hereunto set our hands this 14th day of July, 1894.

CHARLES EDWARD BATCOCK.
JOSEPH WILLIAM BATCOCK.

Witnesses:
JAMES FLEMING,
S. CRASISA.